(No Model.)
H. C. HUBBELL.
MEAT TENDERER.
No. 573,660. Patented Dec. 22, 1896.
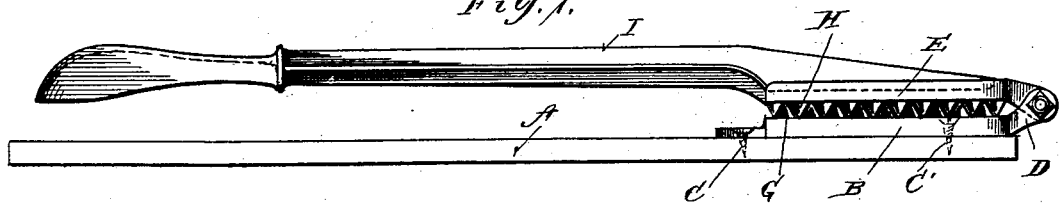
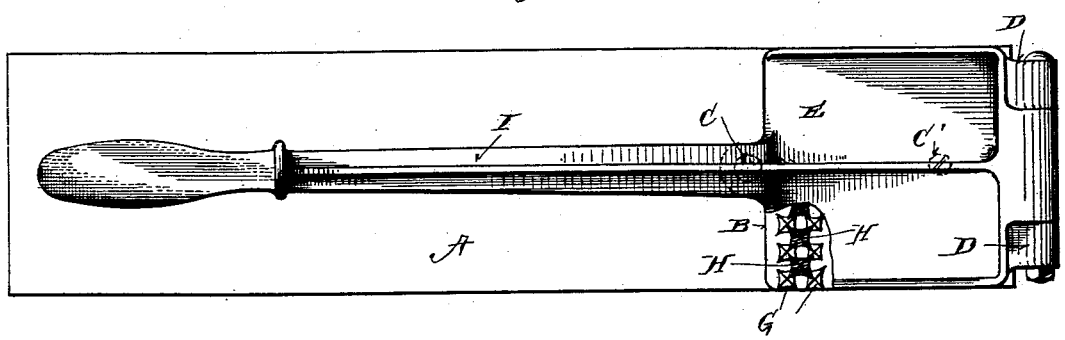
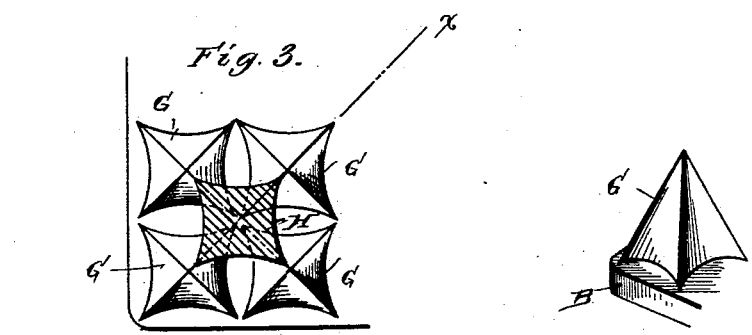
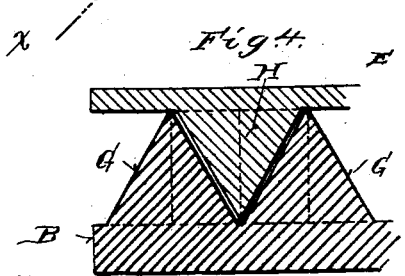
Witnesses
Jas. C. Hawley
W. M. McNair
Inventor
Harvey C. Hubbell
By his Attorney
H. A. Toulmin
THE NORRIS PETERS CO., PHOTO-LITHO., WASHINGTON, D. C.

UNITED STATES PATENT OFFICE.

HARVEY C. HUBBELL, OF SPRINGFIELD, OHIO.

MEAT-TENDERER.

SPECIFICATION forming part of Letters Patent No. 573,660, dated December 22, 1896.

Application filed March 24, 1896. Serial No. 584,606. (No model.)

*To all whom it may concern:*

Be it known that I, HARVEY C. HUBBELL, a citizen of the United States, residing at Springfield, in the county of Clark and State of Ohio, have invented certain new and useful Improvements in Meat-Tenderers, of which the following is a specification, reference being had therein to the accompanying drawings.

My invention relates to a certain new and useful improvement in meat-tenderers.

My invention consists in rigidly connecting an upper plate to its operating-handle and hinging it to a lower stationary plate, the said plates having secured to them suitable cutting-teeth.

It further consists in the peculiar construction and arrangement of said teeth, and also consists of details of construction hereinafter appearing.

In the accompanying drawings, on which like reference-letters indicate corresponding parts, Figure 1 is a side elevation of my improved meat-tenderer; Fig. 2, a plan view partly in section; Fig. 3, a detail view of four of the lower cutting-teeth and a sectional view of one of the upper cutting-teeth, showing their relation to each other when brought together; Fig. 4, a sectional view on the line x x of Fig. 3, and Fig. 5 an enlarged detail perspective view of one of the cutting-teeth.

The letter A represents a base, of wood or metal, upon which is secured a plate B by screws or bolts C C'. Extensions or ears D D are cast or otherwise secured to this plate. To these ears is hinged an upper plate E of the same size and shape as the lower plate. This upper plate has a handle I, cast or otherwise rigidly secured thereto and which is adapted to raise and lower the plate when desired.

On the inner faces of each of these plates B and E are a series of teeth G and H, respectively, which are adapted to match each other in a manner presently to appear. These teeth are in the form of a pyramid in general contour, but have their faces vertically concaved, as clearly shown in Fig. 5. By making these teeth in this manner or form two results are accomplished of great practical advantage in a successful device of this character, namely, sharp cutting edges for each tooth and spaces for the meat between the teeth, and which prevent the grain of the meat from being destroyed, as is the case where the meat is pounded or mashed.

Referring now to Figs. 2 and 3, it will be seen that the cutting edges of each tooth are in line with the cutting edges of its matching tooth. This is the preferred form, but I do not wish to confine myself to this particular arrangement of the teeth so long as they have concave surfaces and sharp cutting edges, as they might be so arranged that the cutting edge in the upper set would fit into the concavity of the lower set without departing from the spirit of my invention.

In operating my tenderer the handle is raised and the meat to be made tender is placed on the lower cutting-plate. The handle and upper plate with its teeth are then brought down and the teeth pressed down as far as they will go, when the handle is raised again, which leaves the meat ready for cooking. By thus operating my device the meat is cut full of little holes and is not mashed. Thus the juice and natural grain of the meat are retained, while at the same time it is rendered easily masticatable.

Referring again to Fig. 5, it will be seen that the cutting edges of the teeth are a slight distance apart. This is for the purpose of allowing a thin tissue, as it were, between each particle of meat in the mass of meat when the same has been operated upon by my device.

Having thus fully described my invention, what I claim as new, and desire to secure by Letters Patent, is—

1. In a meat-tenderer, the combination with a stationary plate and a hinged plate, of pyramidal cutting-teeth having vertical concavities in their faces and secured to the inner side of each of said plates.

2. In a meat-tenderer, the combination with a stationary plate and another plate hinged thereto, of pyramidal vertically-concave cutting-teeth secured to the inner side of each plate and so arranged with respect to each other that when the plates are brought together the cutting edges of the teeth will all be in line with each other.

In testimony whereof I affix my signature in presence of two witnesses.

HARVEY C. HUBBELL.

Witnesses:
   W. M. MCNAIR,
   JAS. C. DAWLEY.